US012786873B2

(12) United States Patent
Bhatoolaul et al.

(10) Patent No.: US 12,786,873 B2
(45) Date of Patent: Nov. 3, 2026

(54) MEASUREMENTS TO SUPPORT LOW POWER WUS

(71) Applicant: Nokia Technologies Oy, Espoo (FI)

(72) Inventors: David Bhatoolaul, Swindon (GB); Jussi-Pekka Koskinen, Oulu (FI); Knud Knudsen, Aalborg (DK); Ganesh Venkatraman, Oulu (FI); Alok Sethi, Oulu (FI); Jorma Johannes Kaikkonen, Oulu (FI); Brajesh Soni, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 321 days.

(21) Appl. No.: 18/443,420

(22) Filed: Feb. 16, 2024

(65) Prior Publication Data

US 2024/0284331 A1 Aug. 22, 2024

(30) Foreign Application Priority Data

Feb. 17, 2023 (IN) ............................ 202341010836

(51) Int. Cl.
*H04W 52/02* (2009.01)

(52) U.S. Cl.
CPC ... *H04W 52/0229* (2013.01); *H04W 52/0245* (2013.01)

(58) Field of Classification Search
CPC ...................... H04W 52/0229; H04W 52/0245
See application file for complete search history.

(56) References Cited

U.S. PATENT DOCUMENTS

| | | | |
|---|---|---|---|
| 11,310,741 | B2 | 4/2022 | Lonnblad et al. |
| 11,317,348 | B2 | 4/2022 | Chitrakar et al. |
| 2018/0018185 | A1 | 1/2018 | Sun et al. |
| 2020/0196244 | A1 | 6/2020 | Zhang et al. |

FOREIGN PATENT DOCUMENTS

| | | | | |
|---|---|---|---|---|
| CN | 111684838 | B | 10/2021 | |
| GB | 2643195 | A * | 2/2026 | ............ H04W 52/02 |
| WO | 2018/090896 | A1 | 5/2018 | |
| WO | 2018/140080 | A1 | 8/2018 | |

(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.3.0, Dec. 2022, pp. 1-210.

(Continued)

*Primary Examiner* — Melvin C Marcelo
(74) *Attorney, Agent, or Firm* — Barta Jones, PLLC

(57) ABSTRACT

There is provided a method, comprising obtaining an evaluation configuration including at least one metric for low power wake-up signal, LP-WUS, trustworthiness evaluation; detecting at least one provided wake-up triggering signal; by use of one metric out of the at least one metric, evaluating the at least one detected wake-up triggering signal based on determining whether or not a condition included in the one metric is fulfilled; and providing a report comprising information indicative of at least a result obtained from the determining of whether or not the condition is fulfilled.

20 Claims, 5 Drawing Sheets

(56) References Cited

FOREIGN PATENT DOCUMENTS

WO 2022/260743 A1 12/2022

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; NR; User Equipment (UE) procedures in Idle mode and RRC Inactive state (Release 17)", 3GPP TS 38.304, V17.3.0, Dec. 2022, pp. 1-51.

"Discussion on evaluations on LP WUS", 3GPP TSG RAN WG1 Meeting #110b-e, R1-2209075, Agenda: 9.13.1, Intel Corporation, Oct. 10-19, 2022, pp. 1-9.

"L1 signal design and procedures for low power WUS", 3GPP TSG RAN WG1 #112, R1-2300700, Agenda: 9.13.3, Nokia, Feb. 27-Mar. 3, 2023, 19 pages.

Extended European Search Report received for corresponding European Patent Application No. 24152760.5, dated Aug. 12, 2024, 9 pages.

* cited by examiner

MEASUREMENTS TO SUPPORT LOW POWER WUS

TECHNICAL FIELD

The present disclosure relates to methods, apparatuses and computer programs for measurements to support a low power wake up signal, LP-WUS.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular 3$^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) and/or even sixth generation (6G) communication networks, cellular 2$^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3$^{rd}$ Generation Partnership Project (3GPP), Telecoms & Internet converged Services & Protocols for Advanced Networks (TISPAN), the International Telecommunication Union (ITU), 3$^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

In such context, there are aims to reduce the power consumption of user equipment (UE) types such as sensors, actuators and wearables, that require a long battery life. Several methods already exist to improve power consumption already specified, for example, Extended Discontinuous Reception (eDRX), which extends the period that the UE sleeps between waking up to monitor for paging. However, some UEs requiring reduced power consumption are also latency sensitive, e.g. sensors for fire detection and extinguishing, and therefore the eDRX solution is not applicable, because it leads to long communication delay.

The wake-up (or WakeUp) signal (WUS) principle, if configured appropriately, enables the network to trigger a UE to wake-up exactly when needed in an event-driven manner, by transmitting a special WUS which is monitored by a dedicated low-power WUS receiver of the UE, thereby avoiding the delays associated with eDRX. When a UE receives the WUS, the logically separated WUS receiver can wake-up the main New Radio (NR) transceiver and normal communication can start.

The WUS receiver is expected to consume significantly less power, compared to the main NR transceiver, by using a simple (WUS) signal that can be detected using dedicated hardware optimized for low power consumption.

However, given the need to be as simple as possible to reduce the power consumption of the dedicated low power WUS (LP-WUS) receiver, there is an increased risk, that a network, and/or device, could be maliciously attacked by an entity transmitting fake clone LP-WUS signals.

Thus, there is need for improvement. Particularly, there is need for improvement in measurements to support a LP-WUS.

It is therefore an object of the present disclosure to improve the prior art.

The following meanings for the abbreviations used in this specification apply:

2G Second Generation
3G Third Generation
3GPP 3$^{rd}$ Generation Partnership Project
3GGP2 3$^{rd}$ Generation Partnership Project 2
4G Fourth Generation
5G Fifth Generation
6G Sixth Generation
AMF Access and Mobility Management Function
AN Access Node
AP Access Point
BS Base Station
CDMA Code Division Multiple Access
CRC Cyclic Redundancy Check
DSL Digital Subscriber Line
EDGE Enhanced Data Rates for Global Evolution
EEPROM Electrically Erasable Programmable Read-only Memory
eDRX Extended Discontinuous Reception
eNB Evolved Node B
ETSI European Telecommunications Standards Institute
gNB Next Generation Node B
GPRS General Packet Radio System
IEEE Institute of Electrical and Electronics Engineers
IoT Internet of Things
ISDN Integrated Services Digital Network
ITU International Telecommunication Union
KPI Key Performance Indicator
LP Low Power
LP-SS LP synchronization signal
LTE Long Term Evolution
LTE-A Long Term Evolution-Advanced
MANETs Mobile Ad-Hoc Networks
MR Main Radio
NB Node B
NR New Radio
PDCCH Physical Downlink Control Channel
RA Registration Area
RAM Random Access Memory
RAN Radio Access Network
ROM Read Only Memory
RRC Radio Resource Control
RRM Radio Resource Management
RSSI Received Signal Strength Indication
SIB System Information Block
SINR Signal to Interference plus Noise Ratio
SNR Signal to Noise Ratio
SSB Synchronization Signal Block
TA Tracking Area
TAC Tracking Area Code
TAI Tracking Area Identifier TISPAN Telecoms & Internet converged Services & Protocols for Advanced Networks
UE User Equipment
UMTS Universal Mobile Telecommunications System
UWB Ultra-Wideband
WBO US Beacon Occasion
WCDMA Wideband Code Division Multiple Access
WiMAX Worldwide Interoperability for Microwave Access
WLAN Wireless Local Area Network
WUR WakeUp Receiver
WUS WakeUp Signal

SUMMARY

It is an objective of various examples of embodiments of the present disclosure to improve the prior art. Hence, at least some examples of embodiments of the present disclosure aim at addressing at least part of the above issues and/or problems and drawbacks.

Various aspects of examples of embodiments of the present disclosure are set out in the appended claims and relate to methods, apparatuses and computer program products relating to improvement in measurements to support a LP-WUS.

The objective is achieved by the methods, apparatuses and non-transitory storage media as specified in the appended claims. Advantageous further developments are set out in respective dependent claims.

Any one of the aspects mentioned according to the appended claims enables an improvement in measurements to support a LP-WUS, thereby allowing to solve at least part of the problems and drawbacks as identified/derivable from above.

Thus, improvement is achieved by methods, apparatuses and computer program products enabling improvement in measurements to support a LP-WUS.

It shall be noted that uses for the WUS include:

Reducing power consumption for Idle/inactive mode UEs monitoring paging

Reducing power consumption for Connected mode UE Physical Downlink Control Channel (PDCCH) monitoring Providing cell specific synchronization support Providing Radio Resource Management (RRM) measurement support Providing LP-WUS threshold detection support.

In relation to uses for WUS, some objectives are the following:

a) Identify evaluation methodology (including the use cases) and Key Performance Indicators (KPIs) [RAN1]

Primarily target low-power WUS/WakeUp Receiver (WUR) for power sensitive, small form-factor devices including Internet of Things (IoT) use cases (such as industrial sensors, controllers) and wearables Other use cases are not precluded b) Study and evaluate low-power wake-up receiver architectures [RAN1, RAN4]

c) Study and evaluate wake-up signal designs to support wake-up receivers [RAN1, RAN4]

d) Study and evaluate L1 procedures and higher layer protocol changes needed to support the wake-up signals [RAN2, RAN1]

e) Study potential UE power saving gains compared to the existing Rel-15/16/17 UE power saving mechanism and their coverage availability, as well as latency impact. System impact, such as network power consumption, coexistence with non-low-power-WUR UEs, network coverage/capacity/resource overhead should be included in the study [RAN1]

Note: The need for RAN2 evaluation will be triggered by RAN1 when necessary.

The present disclosure is related to objective d), which targets the study and evaluation of procedural changes to support the LP-WUS.

Further advantages become apparent from the following detailed description.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
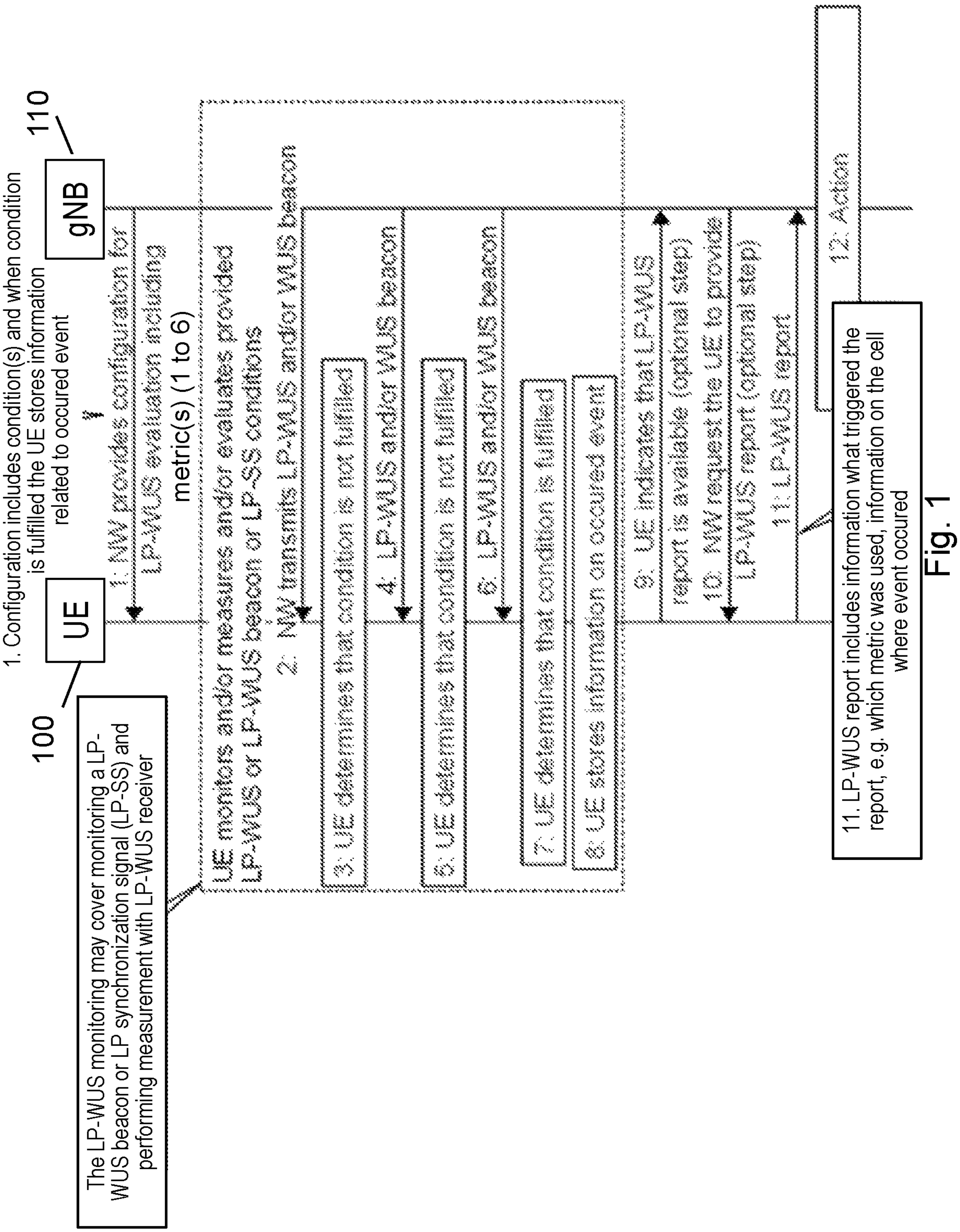
FIG. 1 shows a signaling diagram according to various examples of embodiments.

Basically, for properly establishing and handling a communication between two or more end points (e.g. communication stations or elements or functions, such as terminal devices, user equipments (UEs), or other communication network elements, a database, a server, host etc.), one or more network elements or functions (e.g. virtualized network functions), such as communication network control elements or functions, for example access network elements like access points (APs), radio base stations (BSs), relay stations, eNBs, gNBs etc., and core network elements or functions, for example control nodes, support nodes, service nodes, gateways, user plane functions, access and mobility functions etc., may be involved, which may belong to one communication network system or different communication network systems.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks like 4G and/or LTE (and even 6G) where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, like e.g. 6G communication networks (technologies) and/or communication networks (technologies) to be developed at an even later date, such as a wired communication network or datacenter networking.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit (CU), which controls a respective coverage area or cell(s) and with which one or more communication stations such as communication elements or functions, like user devices (e.g. customer devices), mobile devices, or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, (core) network elements or network functions ((core) network control elements or network functions, (core) network management elements or network functions), such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node (AN) or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a mobile device, a terminal device, control elements or functions, such as access network elements, like a base station (BS), an eNB/gNB, a radio network controller, a core network control element or function, such as a gateway element, or other network elements or functions, as described herein, (core) network management element or function and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Moreover, with regard to LP-WUS, as already indicated above, given the need to be as simple as possible to reduce the power consumption of the dedicated LP-WUS receiver, there is an increased risk, that a network, and/or device, could be maliciously attacked by an entity transmitting fake clone LP-WUS signals.

Whilst for many devices this may not be catastrophic, since at a later stage of the paging procedure (the primary use case, but other use cases exist), the device will quickly determine there is no paging, the act of triggering the main radio to switch on using a fake WUS, will increase the power consumption of device unnecessarily.

For some devices and some use cases (e.g. LP-WUS based safety sensors), this could deplete the available power source far sooner than intended and potentially place the end users at risk.

Hence, one problem addressed with this disclosure relates to what the UE/network can do to identify and then report a suspected attack. With knowledge of a suspected attack, the network can potentially take measures to mitigate/prevent further attacks.

It shall be noted that the principles behind this disclosure can be easily adapted to resolve other problems, including at least one of wake-up signal load balancing or interference management, e.g. along with fake WUS simultaneously by configuring the UE for LP-WUS evaluation including one or more (of the below-outlined) metric(s). Additionally and/or alternatively, the principles may also be easily adapted to allow for LP-WUS resource configuration optimization. Moreover, irrespective of load/interference, some of the below-outlined metrics could help and/or be advantageous in tailoring and/or modifying LP-WUS characteristics to suit the given radio conditions more efficiently.

In the following, examples of embodiments are outlined.

In doing so, in view of identifying erroneous WUS, it shall be noted that with regard to the prior art, it is targeted specifically to wifi periodic signals. According to at least some examples of embodiments, however, a periodical beacon WUS signal may not necessarily be assumed.

Moreover, with further regard to the prior art, one erroneous beacon detection method requires a detector to detect and compare values carried by successive beacon signals. These values have a deterministic relationship between successive beacons, allowing some erroneous beacons to be identified. According to at least some examples of embodiments, however, no new value is being added to the contents of the WUS to assist in the detection of erroneous WUS signals and/or statistics/metrics are being defined to identify suspicious/poorly configured WUS signals.

Further, with further regard to the prior art, in addition to the value detection as indicated above, the device could also optionally measure one or more of the following signal quality metrics received Signal Strength Indication (RSSI), signal to noise ratio (SNR), or signal to interference plus noise ratio (SINR). According to at least some examples of embodiments, however, there are provided specified metrics, based not on signal power or quality, but on the frequency and/or precise point of failure.

With regard to the mentioned "precise point of failure", the following is further to be considered. Namely, in general, it is a 3GPP philosophy to make measurements hardware agnostic. However, at least some of the metrics (e.g. METRIC1 to METRIC6) as outlined below in detail are breaking that philosophy and take hardware location into account. I.e., it may be said that by use of one of the below-outlined metrics, a LP-WUS may be evaluated in view of a hardware location, like e.g. a location (e.g. location where an event occurred) related to a LP-WUS detected by a UE and/or a location where the detecting UE locates/resides. In doing so, the UE using one of the below-outlined metrics for evaluating a detected LP-WUS, may provide a report and/or an alarm (and/or may trigger an action to be performed in the network as outlined below in more detail), which further comprises location information. These location information may comprise at least one of a location of the occurred event to which the LP-WUS may be related, or a location of the UE providing the report and/or alarm (and/or the triggering). Hence, the network obtaining such report and/or alarm may perform further action based on the thus obtained location information, e.g. an action may be performed at a location where the UE is located/resides (e.g. at a cell (and/or neighboring cell(s)) in which cell coverage area the UE is located/resides).

Furthermore, according to at least some examples of embodiments, this disclosure proposes new network configured metric(s) relating to the reception of the wake-up signal, for UE(s) to measure and either report or trigger alarms or other actions (e.g. trigger main radio to perform cell measurements), for multiple purposes, including at least one of:

- Initiate network measures to mitigate further suspected spoof/clone WUS attack;
- Trigger load-balancing to redistribute UEs across multiple LP-WUS signals to minimize congestion;
- Trigger re-configuration/adjustment to the applied number of sub-groups in LP-WUS or re-configuration of the applied LP-WUS configuration e.g. the sub-group of the UE;
- Trigger reconfiguration to minimize interference to or from neighboring cells;
- Adjust WUS characteristics such as power, repetition, length, to either make the WUS more robust or to optimize resource usage;
- Trigger cell mobility or further cell mobility measurements—using relative powers of neighbor cell LP-WUS; or
- Trigger MAIN RADIO operation only, comprising ignoring LP-WUS (completely) and/or disabling LP-WUS and/or ignoring/disabling a certain UE.

In this disclosure, there are provided metrics for the UE to measure the reception quality/success/failure of the LP-WUS. Alternatives for this metric are listed below (see METRIC1 to METRIC6):

METRIC1: For a configured time period, or number of detected LP-WUS, the number of LP-WUSs successfully detected, and decoded (e.g. passing any cyclic redundancy check (CRC) or security checks) which then fail at the next main radio receiving and decoding step.

With regard to METRIC1, it shall be noted that this metric may most likely be used for spoof attack. One main reason for failure of the MAIN RADIO to fail the paging message decoding step may be the original LP-WUS being a FAKE CLONE. In this context, the term "FAKE CLONE" shall be understood as representing a "cloned" signal (e.g. cloned LP-WUS) created to maliciously fool a system. Accordingly, "cloned" may be understood is such a way, that the "cloned signal" may be provided/originate from an entity/device/apparatus, which aims to clone and/or imitate and/or replicate e.g. the LP-WUS provided by the network. The intention behind such "cloned signal" may be that a UE detecting such "cloned signal" may erroneously consider this "cloned signal" to be an authentic and/or reliable and/or real signal provided by the network.

- In one example, the number of times is counted for when the UE main radio successfully detects, receives and decodes paging message (if the LP-WUS indicates the IDLE or INACTIVE UE to monitor paging) but within the paging message there is with no paging for that specific UE i.e. count of false alarms for paging message decoding.

In another example, the number of times is counted for when the UE main radio fails to detect, receive and decode paging message.

In one example, the counter is decreased in the case paging is successfully received and counter is increased in the case paging is not successfully received.

In another example, the number of times is counted and summed for when the UE main radio either fails to detect, receive and decode paging message or detects and decodes the paging message, or fails to read any paging message for that specific UE. (I.e. a combination of the previous 2 examples)

METRIC2: For a configured time period, or number of detected LP-WUS, the number of LP-WUSs that can be detected but which fail a WUS specific decoding step, e.g. due to incorrect security word/coding, is measured.

With regard to METRIC2, it shall be noted that LP-WUSs, which are provided by the network to be detected by a certain UE(s) (e.g. in a certain area, like certain cell coverage area), may carry a certain security word. Hence, such above-mentioned fail may be triggered by (another) FAKE CLONED WUS, since a fake does not carry the correct security word, and/or my be triggered due to interference from a neighbour cell (e.g. neighbour cell LP-WUS), since in the case of interference a different security word is carried. It shall be noted that e.g. a LP-WUS from a neighbour cell may be real or fake.

METRIC3: For a configured time period, or number of detected LP-WUSs, the number of LP-WUSs successfully detected, but which cannot be decoded is measured.

With regard to METRIC3, it shall be noted that the issue about the measuring may be a coding issue. The network, which provides the LP-WUS(s), could reconfigure (e.g. in response to obtaining/receiving a report and/or alarm from a UE(s) as outlined below in detail) that LP-WUS to have a higher coding gain to ensure decoding.

METRIC4: For a configured time period, or number of detected LP-WUSs, a metric to indicate the relative or absolute strength of the LP-WUS signal received is measured. Strength could be relative to other cell signals, e.g. the 5G Synchronization Signal Block (SSB) or a periodically transmitted beacon LP-WUS or absolute.

In one example. This measure of strength is only measured for when main radio paging reception fails.

With regard to METRIC4, it shall be noted that indication of the relative or absolute strength may be used, as one example, to make the LP-WUS more robust at cell edge by increasing a coding rate. Such code rate increase may be performed by the network in response to the network obtaining/receiving a report and/or alarm from a UE(s) as outlined below in detail.

METRIC5: UE logs the time difference between receiving LP-WUS signal to the start of the paging message and/or to a decoding of the paging message being completed. This is useful for scheduling the LP-WUS transmission by gNB. This metric is valuable in the case of a non-periodic WUS transmission.

This allows scope for different devices to have different/varying LP-WUS to main radio switching performance, without the need for strict categorization or capability signalling This could be used to optimise LP-WUS duty cycle operation characteristics, when ALWAYS ON operation is not applied.

With regard to METRIC5, it shall be noted that this metric is more focused on LATENCY effectiveness of the LP-WUS.

METRIC6: For a configured time period, or a number of LP-WUS and/or LP-BEACON transmissions, the average time axis drift delay is measured and can either be reported (possibly after exceeding a configured threshold) or used to trigger other actions Number of missed LP-BEACON gives early indication of LP-WUS detectability Average time axis drift and number of times the drift delay exceeds an upper threshold can indicate the UE's probability of going out of synch in LP-WUS mode of operation This metric would enable the NW to take corrective actions like increasing the LP-WUS and/or BEACON transmit power, WUS and BEACON occasions/repetition, triggering MR to measure serving cell and subsequently cell reselection, or keeping UEs main radio (MR) on.

According to various examples of embodiment, given there can be configured multiple LP-WUS signals that a UE can receive in one cell, e.g., from neighboring cells, or periodically transmitted as beacon to support cell identification and power measurement/receiver calibration, the network can configure which LP-WUS devices should target for these metrics.

According to various examples of embodiment, the network could configure, all or a subset of UEs to report one or more of these metrics/alarms.

In one example, the UE may be configured to indicate/report to network if a configured threshold value is exceeded.

With regard to such threshold value(s), it shall be noted that such threshold value(s) could be predefined, defined on a per UE basis and configured per UE radio resource control (RRC), and/or defined on a cell specific level and broadcast in a system information block (SIB).

According to various examples of embodiment, the network may require the UE to report the support of an optional measurement capability, for the network to configure these metrics.

Depending on the configuration of the network and the primary concerns of the network, these metrics collected as either alarms or reports from multiple UEs, could allow the network to at least one of the following:

Reconfigure the LP-WUS to use different resources/codewords to avoid suspected spoof attack;

Reconfigure the mapping of LP-WUSs to different UEs to improve load balancing and/or reduce false alarm for certain UEs; or Reconfigure the LP-WUS to use different resources/bits/power to either improve robustness or optimize resource usage.

Reconfigure the/certain UE(s) to exit LP-WUS mode (alternatively and/or additionally, the UE may determine to exit LP-WUS mode in case, e.g. a predetermined threshold value is exceeded when using one of the above-outlined metrics; hence, either the network may reconfigure a mode of operation or the UE does so autonomously).

Moreover, according to at least some examples of embodiments, the following steps may be considered:

Reference is made to FIG. 1. FIG. 1 shows a signaling diagram according to various examples of embodiments. The following steps are outlined with regard to FIG. 1. It shall be noted that not necessarily all steps are to be performed and/or need to be performed in such order. E.g., the UE 100 may determine that a condition is fulfilled (e.g. step 7) without determining before (e.g. steps 3 and 5) that a condition is not fulfilled.

1. Network (NW) (like e.g. such gNB 110 representing an example for an access network element as illustrated in FIG. 1) provides configuration for LP-WUS evaluation including one or more metric(s) (1 to 6). Configuration includes condition(s) and when condition is fulfilled the UE 100 stores information related to occurred event. UE 100 monitors and/or measures and/or evaluates provided LP-WUS or LP-WUS beacon or LP synchronization signal (LP-SS) conditions. The LP-WUS monitoring may cover monitoring a LP-WUS beacon or LP-SS and performing measurement with LP-WUS receiver;
2. NW transmits LP-WUS and/or WUS beacon;
3. UE 100 determines that condition is not fulfilled;
4. NW provides LP-WUS and/or WUS beacon;
5. UE 100 determines that condition is not fulfilled;
6. NW provides LP-WUS and/or WUS beacon;
7. UE 100 determines that condition is fulfilled;
8. UE 100 stores information on occurred event;
9. UE 100 indicates that LP-WUS report is available (optional step);
10. NW request the UE 100 to provide LP-WUS report (optional step);
11. LP-WUS report; LP-WUS report includes information what triggered the report e.g. which metric was used, information on the cell where event occurred;
12. NW performs action which can be e.g. initiate network measures to mitigate further suspected spoof/clone WUS attack, trigger load-balancing given multiple UEs sharing the same WUS, trigger reconfiguration to minimize interference from neighboring cells, adjust WUS characteristics such as power, repetition, length, to either make the WUS more robust or optimize resource usage.

In the following, further examples of embodiments are described in relation to the above described methods and/or apparatuses.

Figure 2:
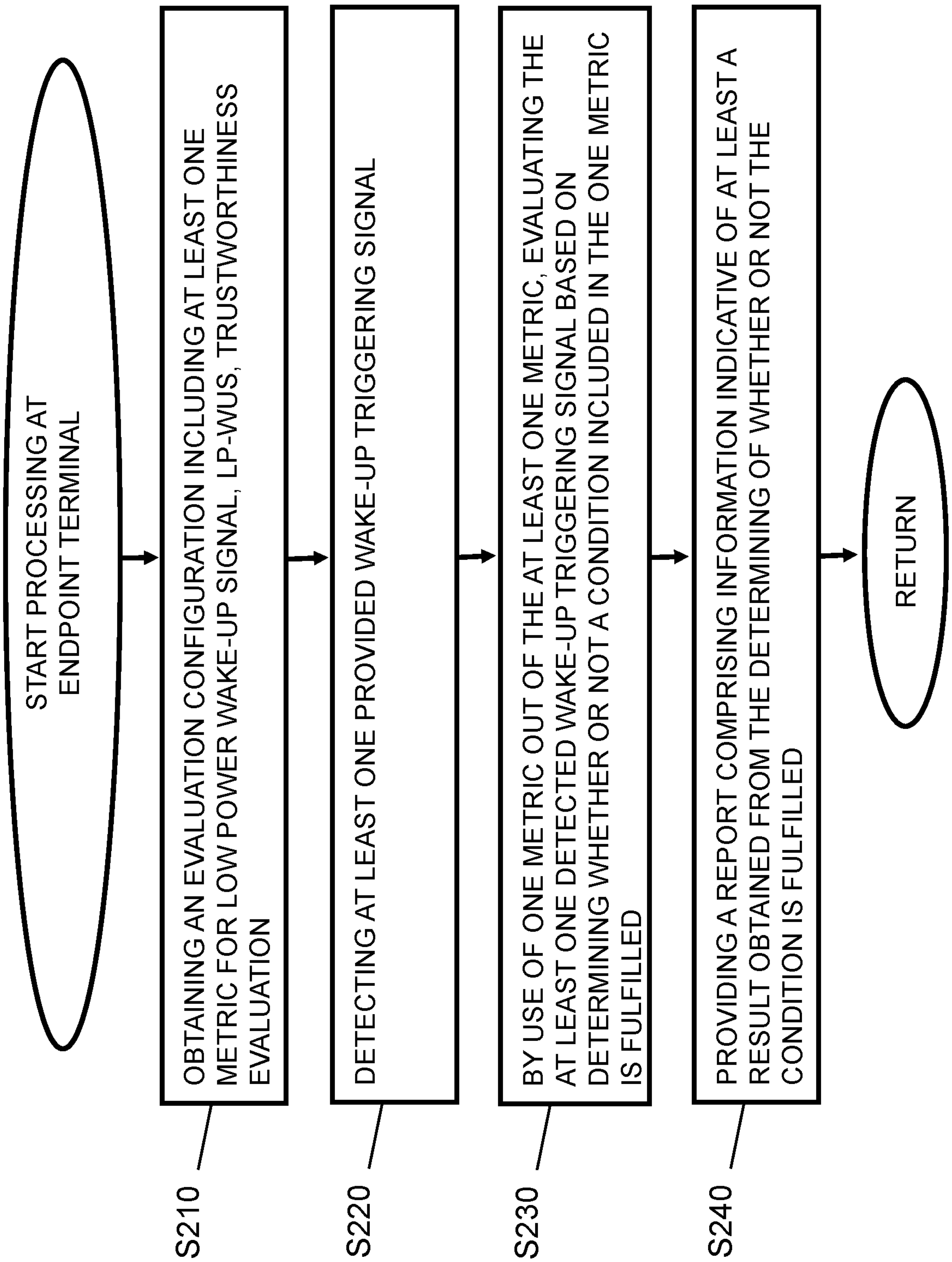
FIG. 2 shows a flowchart illustrating steps corresponding to a method according to various examples of embodiments.

Referring now to FIG. 2, there is shown a flowchart illustrating steps corresponding to a method according to various examples of embodiments. Such steps may represent at least part of these steps 1 to 12 as outlined directly above with reference to FIG. 1.

In particular, according to FIG. 2, in S210, the method comprises obtaining an evaluation configuration including at least one metric for low power wake-up signal, LP-WUS, trustworthiness evaluation.

It shall be noted that the method may be applied by an endpoint terminal, which may represent such user equipment, e.g. UE 100, as outlined above, e.g. with reference to the above-outlined steps 1 to 12 in FIG. 1. In addition, such evaluation configuration may represent at least such configuration provided by the network as outlined above e.g. under step 1 (from the steps 1 to 12). In this context, provided by the network may be understood as provided by a network entity, like e.g. an access network element, which may represent a gNB, e.g. such gNB 110 as illustrated in FIG. 1. Moreover, obtaining may be understood as receiving, but may also be understood as being acquired from a connected storage medium. Furthermore, the at least one metric may be at least one of the six metrics METRIC1 to METRIC6 as outlined above. In addition, the LP-WUS trustworthiness evaluation may be represent such LP-WUS evaluation as outlined above e.g. under step 1 (from the steps 1 to 12 in FIG. 1).

Further, in S220, the method comprises detecting at least one provided wake-up triggering signal.

It shall be noted that the method may further comprise that a monitoring is performed, wherein the detecting is performed during the monitoring. In addition, the wake-up triggering signal may represent such LP-WUS and/or LP-WUS beacon and/or LP-SS as outlined above e.g. under step 1 (from the steps 1 to 12 in FIG. 1). Furthermore, provided may be understood as being transmitted, but may also be understood as being made available for being acquired, like e.g. via download. In this context, the wake-up triggering signal may be provided by a network entity, like e.g. an access network element, which may represent a gNB like such gNB 110 as illustrated in FIG. 1, an access network management entity or function, which may represent an Access and Mobility Management Function (AMF), and/or by an endpoint terminal, which may represent a user equipment.

Additionally, in S230, the method further comprises, by use of one metric out of the at least one metric, evaluating the at least one detected wake-up triggering signal based on determining whether or not a condition included in the one metric is fulfilled.

It shall be noted that with regard to the above-outlined six metrics, METRIC1 to METRIC6, such condition may e.g. represent, with reference to METRIC1, that a (pre)configured number of successfully detected and decoded wake-up triggering signals, which then fail at the next main radio receiving and decoding step, is reached within a (pre) configured time period. Similarly, different further conditions are derivable from each of the METRIC1 to METRIC6.

Furthermore, in S240, the method further comprises providing a report comprising information indicative of at least a result obtained from the determining of whether or not the condition is fulfilled.

It shall be noted that such providing of the report may represent at least part of such providing of a LP-WUS report as outlined above e.g. under step 11 (from the steps 1 to 12 in FIG. 1).

Moreover, according to at least some examples of embodiments, the method may further comprise that the evaluating by use of the one metric further comprises measuring at least one of a reception quality, a success or a failure of the at least one detected wake-up triggering signal, and wherein the determining about whether or not the condition is fulfilled may be based on evaluating the measured at least one of reception quality, success or failure compared to a respective predetermined reference value.

Furthermore, according to various examples of embodiments, wherein from the at least one metric at least one may be selected from the following metrics:

a first metric, by use of which the evaluating further comprises determining, for a preconfigured time period and/or a preconfigured number of detected wake-up triggering signals, a number of wake-up triggering signals successfully detected and decoded, which after the successful detection and decoding fail at a main radio receiving and decoding step;

a second metric, by use of which the evaluating further comprises measuring, for a preconfigured time period and/or a preconfigured number of detected wake-up triggering signals, a number of detectable wake-up triggering signals, which fail a preconfigured wake-up triggering signal decoding step;

a third metric, by use of which the evaluating further comprises measuring, for a preconfigured time period and/or a preconfigured number of detected wake-up triggering signals, a number of wake-up triggering signals successfully detected, but which are unable to be decoded;

a fourth metric, by use of which the evaluating further comprises measuring, for a preconfigured time period and/or a preconfigured number of detected wake-up triggering signals, a relative and/or absolute strength of a detected wake-up triggering signal;

a fifth metric, by use of which the evaluating further comprises logging a time difference between detected wake-up triggering signals to a time for checking for paging;

a sixth metric, by use of which the evaluating further comprises measuring, for a preconfigured time period and/or a preconfigured number of detected wake-up triggering signals and/or a preconfigured number of low power beacon transmissions, an average time axis drift delay.

It shall be noted that the first metric may represent at least part of such METRIC1 as outlined above, that the second metric may represent at least part of such METRIC2 as outlined above, that the third metric may represent at least part of such METRIC3 as outlined above, that the fourth metric may represent at least part of such METRIC4 as outlined above, that the fifth metric may represent at least part of such METRIC5 as outlined above, and that the sixth metric may represent at least part of such METRIC6 as outlined above.

Additionally, according to various examples of embodiments, when using the first metric, the method may further comprise counting a number of times for successfully detecting, receiving and decoding a paging message, wherein within the paging message there is no paging for an endpoint terminal performing the successful detecting, receiving and decoding; and/or counting a number of times for failing detecting, receiving and decoding a paging message; and/or counting and summoning a number of times for either failing detecting, receiving and decoding a paging message or detecting and decoding the paging message, or failing reading any paging message for the endpoint terminal performing the successful detecting, receiving and decoding.

Optionally, according to at least some examples of embodiments, when using the fourth metric, the method may further comprise only measuring for the strength when a main radio paging reception fails.

Further, according to various examples of embodiments, wherein the method may further comprise that a monitoring and/or the detecting and/or the evaluating and/or the measuring of the wake-up triggering signal comprises monitoring and/or detecting and/or evaluating and/or measuring of at least one of LP-WUS, LP-WUS beacon or a low power synchronization signal, LP-SS; and/or wherein the determining of whether or not the condition is fulfilled may comprise determining at least one of a LP-WUS condition, a LP-WUS beacon condition or a LP-SS condition.

Moreover, according to at least some examples of embodiments, when determined that the condition is fulfilled, the method may further comprise that the providing of the report further comprises providing information indicative of the metric used for the evaluating; and/or when determined that the condition is not fulfilled, the method may further comprise that the providing of the report further comprises triggering an alarm; and/or when determined that the condition is not fulfilled, the method may further comprise that the providing of the report further comprises triggering a main radio to perform cell measurements.

Furthermore, according to various examples of embodiments, the method may further comprise, when determined that the condition is fulfilled, storing information related at least to one of an event indicated by the detected at least one wake-up triggering signal or a location related to the event; wherein the providing of the report may further be based on the information stored and/or wherein the providing of the report may further comprise providing the information stored.

Additionally, according to various examples of embodiments, the method may further comprise obtaining an application configuration comprising application instructions indicating whether or not a metric from the at least one metric is to be used for the evaluating; and evaluating the at least one detected wake-up triggering signal based on the obtained application configuration.

Optionally, according to at least some examples of embodiments, the method may further comprise obtaining a reporting configuration comprising reporting instructions; and based on the obtained reporting configuration, reporting if a threshold value from the at least one metric and/or a threshold value defined in relation to the at least one metric is exceeded; and/or reporting a support of an optional measurement capability.

It shall be noted that such threshold value my represent such predetermined and/or preconfigured threshold values as outlined above.

Further, according to various examples of embodiments, the method may further comprise indicating that the report is available. It shall be noted that such indicating may e.g. be broadcasted, single-casted, and/or may be transmitted to/provided for individually selected (types and/or groups and/or locations of) endpoint terminals.

The above-outlined solution allow for improvements in measurements to support a LP-WUS. Therefore, the above-outlined solution is advantageous in that it enables for efficient and/or secure and/or robust and/or failure resistant and/or flexible measurements to support a LP-WUS.

Particularly, the above-outlined solution is advantageous, since it enables for improvements in at least one of:

initiating network measures to mitigate (further) suspected spoof/clone WUS attack(s), triggering load-balancing to redistribute endpoint terminals across multiple LP-WUS signals to minimize congestion, triggering re-configuration/adjustment to an applied number of sub-groups in LP-WUS or re-configuration of an applied LP-WUS configuration e.g. the sub-group of the endpoint terminal, triggering reconfiguration to minimize interference to or from neighbouring cells (neighbouring e.g. in relation to the cell to which the endpoint terminal is communicatively connected), adjusting WUS characteristics such as power and/or repetition and/or length to either make the WUS more robust or to optimise resource usage, triggering cell mobility or further cell mobility measurements, by e.g. using relative powers of neighbour cell LP-WUS;

triggering MAIN RADIO operation only, comprising ignoring LP-WUS (completely) and/or disabling LP-WUS and/or ignoring/disabling a certain UE.

Figure 3:
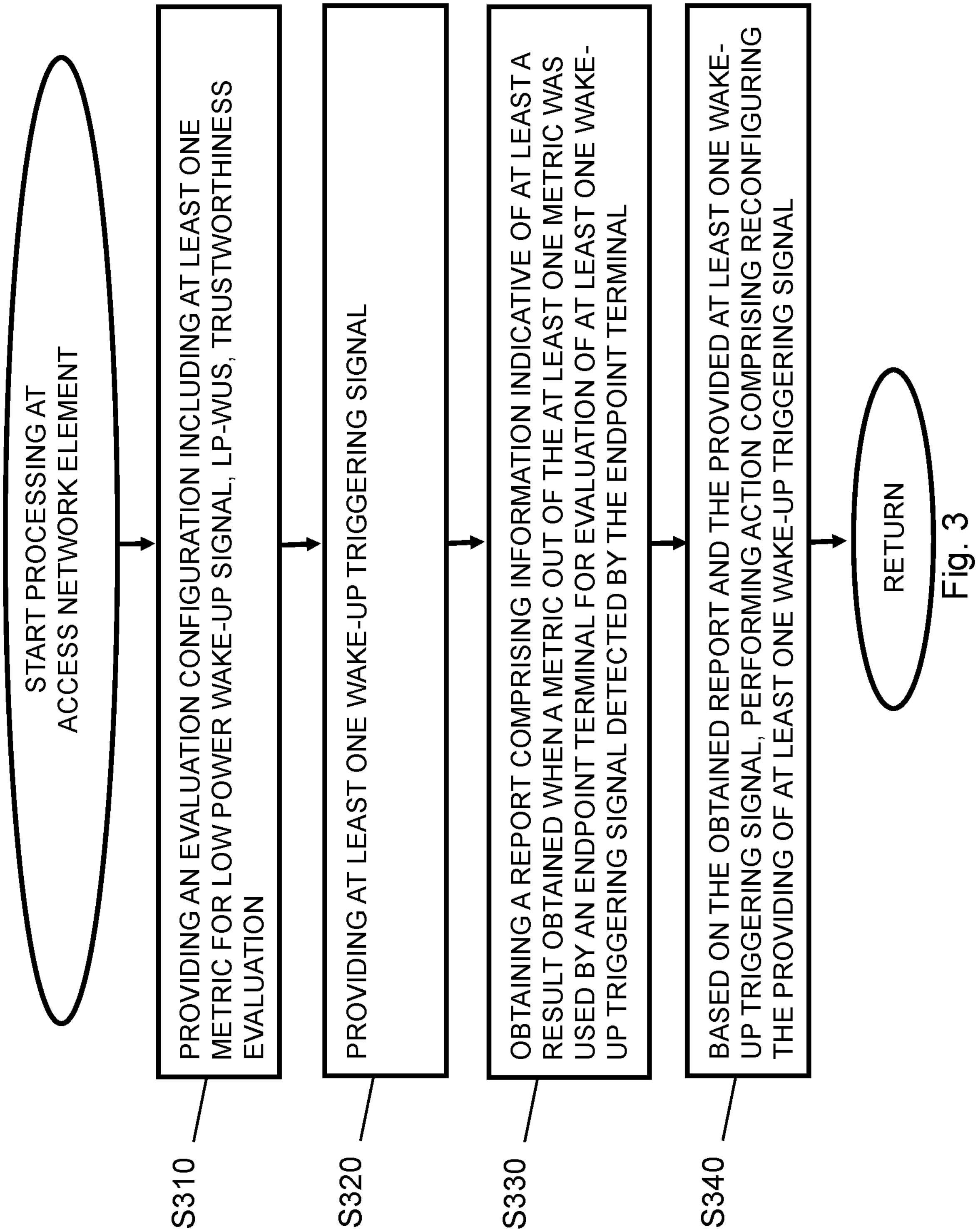
FIG. 3 shows a flowchart illustrating steps corresponding to a method according to various examples of embodiments.

Referring now to FIG. 3, FIG. 3 shows a flowchart illustrating steps corresponding to a method according to various examples of embodiments. Such steps may represent at least part of these steps 1 to 12 in FIG. 1 as outlined above.

It shall be noted that, unless otherwise stated, similar terms/expressions used in FIGS. 2 and 3 are to be understood similarly and a repetitive explanation thereof may be omitted.

In particular, according to FIG. 3, in S310, the method comprises providing an evaluation configuration including at least one metric for low power wake-up signal, LP-WUS, trustworthiness evaluation.

It shall be noted that the method (i.e. the providing) may be performed by the network, which may be represented by an access network element, like e.g. a gNB (like such gNB 110 as illustrated in FIG. 1), or by a access network management entity or function, like e.g. an AMF. Moreover, at least parts of this method may also be applied by an endpoint terminal. Furthermore, such providing may represent at least part of such providing as outlined above e.g. under step 1 (from the steps 1 to 12 in FIG. 1).

Further, in S320, the method comprises providing at least one wake-up triggering signal.

Such providing may represent at least part of such providing as outlined above e.g. under step 2 (from the steps 1 to 12 in FIG. 1).

Furthermore, in S330, the method comprises obtaining a report comprising information indicative of at least a result obtained when a metric out of the at least one metric was used by an endpoint terminal for evaluation of at least one wake-up triggering signal detected by the endpoint terminal.

In addition, in S340, the method comprises, based on the obtained report and the provided at least one wake-up triggering signal, performing action comprising reconfiguring the providing of at least one wake-up triggering signal.

Such performing may represent at least part of such performing as outlined above e.g. under step 12 (from the steps 1 to 12 in FIG. 1).

Furthermore, according to various examples of embodiments, the method may further comprise providing an application configuration comprising application instructions indicating by which at least one endpoint terminal the at least one metric is to be used.

It shall be noted that a selection of the at least one endpoint terminal being enabled to use a selected one or several of the at least one metric may be based on at least one of the following: the individual endpoint terminal, a group of endpoint terminals, a type of endpoint terminals or a location of endpoint terminals.

Additionally, according to various examples of embodiments, the method may further comprise providing a reporting configuration comprising reporting instructions indicating to report if a threshold value from the at least one metric and/or a threshold value defined in relation to the at least one metric is exceeded; and/or to report a support of an optional measurement capability.

Optionally, according to at least some examples of embodiments, the method may further comprise that the reconfiguring comprises at least one of

- reconfiguring the provided at least one wake-up triggering signal to use different resources and/or code-words,
- reconfiguring a mapping of the provided at least one wake-up triggering signal to different endpoint terminals for load balancing improvement and/or false alarm reduction,
- reconfiguring the provided at least one wake-up triggering signal to use different resources and/or different bits and/or different power for either improving robustness or optimizing resource usage, or
- reconfiguring a configuration to be provided to the endpoint terminal to exit LP-WUS mode.

Additionally, according to various examples of embodiments, the method may further comprise requesting toward an endpoint terminal to provide a report in relation to an evaluation of wake-up triggering signals detected and evaluated at the endpoint terminal, the evaluation optionally by use of at least one metric selected from the provided at least one metric. It shall be noted that such requesting may be made toward a single/individual endpoint terminal, but also and/or alternatively toward a type (e.g. sensor) of endpoint terminal, toward a group of endpoint terminal and/or toward endpoint terminals at a certain location (e.g. a certain (radio) cell/cell coverage area).

The above-outlined solution allow for improvements in measurements to support a LP-WUS. Therefore, the above-outlined solution is advantageous in that it enables for efficient and/or secure and/or robust and/or failure resistant and/or flexible measurements to support a LP-WUS.

Particularly, the above-outlined solution is advantageous, since it enables for improvements in at least one of:

- initiating network measures to mitigate (further) suspected spoof/clone WUS attack(s),
- triggering load-balancing to redistribute endpoint terminals across multiple LP-WUS signals to minimize congestion,
- triggering re-configuration/adjustment to an applied number of sub-groups in LP-WUS or re-configuration of an applied LP-WUS configuration e.g. the sub-group of the endpoint terminal,
- triggering reconfiguration to minimize interference to or from neighbouring cells (neighbouring e.g. in relation to the cell to which the endpoint terminal is communicatively connected),
- adjusting WUS characteristics such as power and/or repetition and/or length to either make the WUS more robust or to optimise resource usage,
- triggering cell mobility or further cell mobility measurements, by e.g. using relative powers of neighbour cell LP-WUS, or
- triggering MAIN RADIO operation only, comprising ignoring LP-WUS (completely) and/or disabling LP-WUS and/or ignoring/disabling a certain UE.

Figure 4:
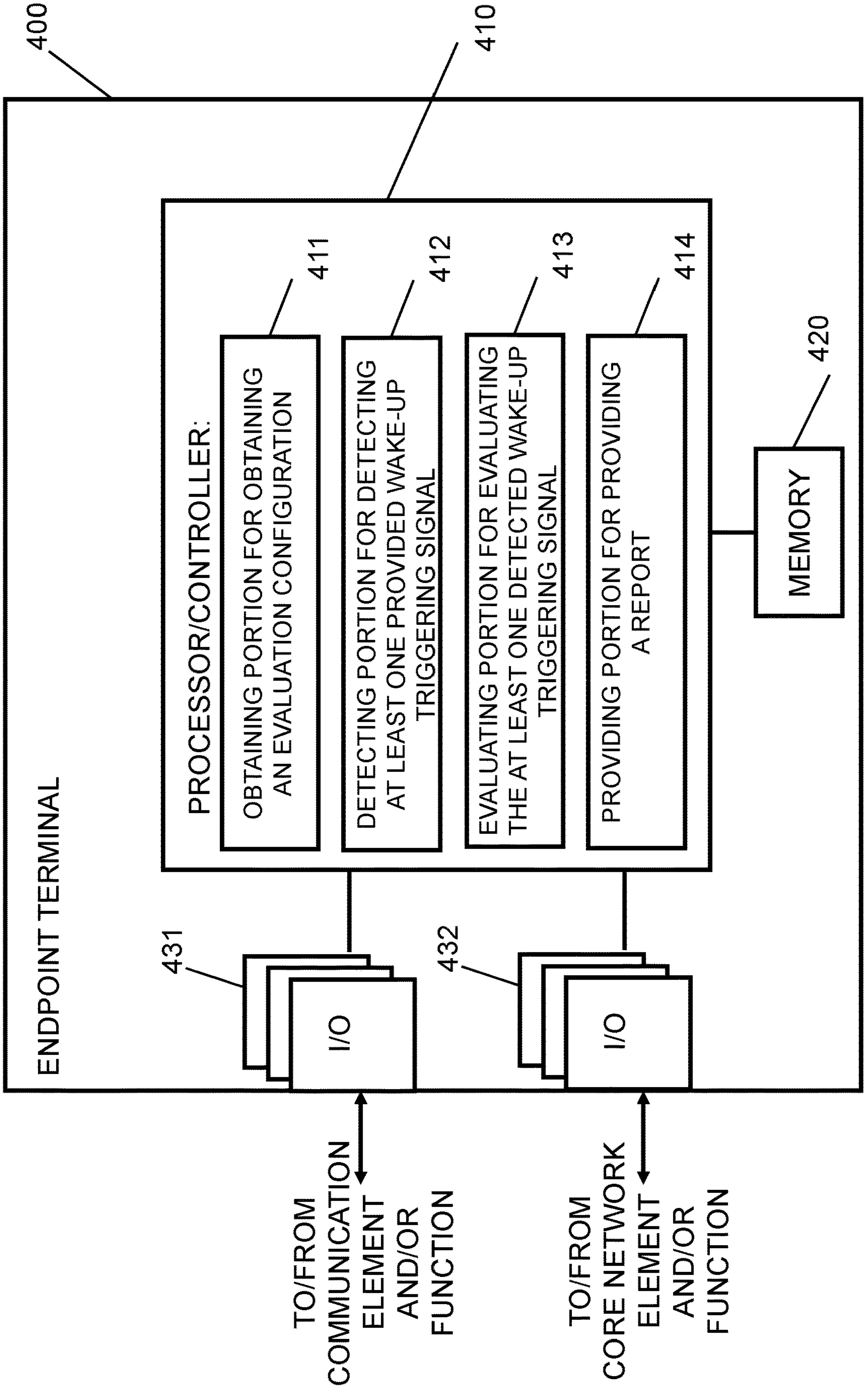
FIG. 4 shows a block diagram illustrating an apparatus according to various examples of embodiments.

Referring now to FIG. 4, FIG. 4 shows a block diagram illustrating an apparatus according to various examples of embodiments.

Specifically, FIG. 4 shows a block diagram illustrating an apparatus 400, which may represent an endpoint terminal, like e.g. such user equipment as outlined above with reference to steps 1 to 12 in FIG. 1, according to various examples of embodiments, which may participate in measurements to support a LP-WUS. Furthermore, even though reference is made to an endpoint terminal, the endpoint terminal may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 400 shown in FIG. 4 may include a processing circuitry, a processing function, a control unit or a processor 410, such as a CPU or the like, which is suitable to enable measurements to support a LP-WUS. The processor 410 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 431 and 432 denote input/output (I/O) units or functions (interfaces) connected to the processor or processing function 410. The I/O units 431 and 432 may be a combined unit including communication equipment towards several entities/elements, or may include a distributed structure with a plurality of different interfaces for different entities/elements. Reference sign 420 denotes a memory usable, for example, for storing data and programs to be executed by the processor or processing function 410 and/or as a working storage of the processor or processing function 410. It is to be noted that the memory 420 may be implemented by using one or more memory portions of the same or different type of memory, but may also represent an external memory, e.g. an external database provided on a cloud server.

The processor or processing function 410 is configured to execute processing related to the above described processing. In particular, the processor or processing circuitry or function 410 includes one or more of the following sub-portions. Sub-portion 411 is an obtaining portion, which is usable as a portion for obtaining an evaluation configuration. The portion 411 may be configured to perform processing according to S210 of FIG. 2. Further, sub-portion 412 is a detecting portion, which is usable as a portion for detecting at least one provided wake-up triggering signal. The portion 412 may be configured to perform processing according to S220 of FIG. 2. Moreover, sub-portion 413 is an evaluating portion, which is usable as a portion for evaluating the at least one detected wake-up triggering signal. The portion 413 may be configured to perform processing according to S230 of FIG. 2. In addition, sub-portion 414 is a providing portion, which is usable as a portion for providing a report. The portion 414 may be configured to perform processing according to S240 of FIG. 2.

Figure 5:
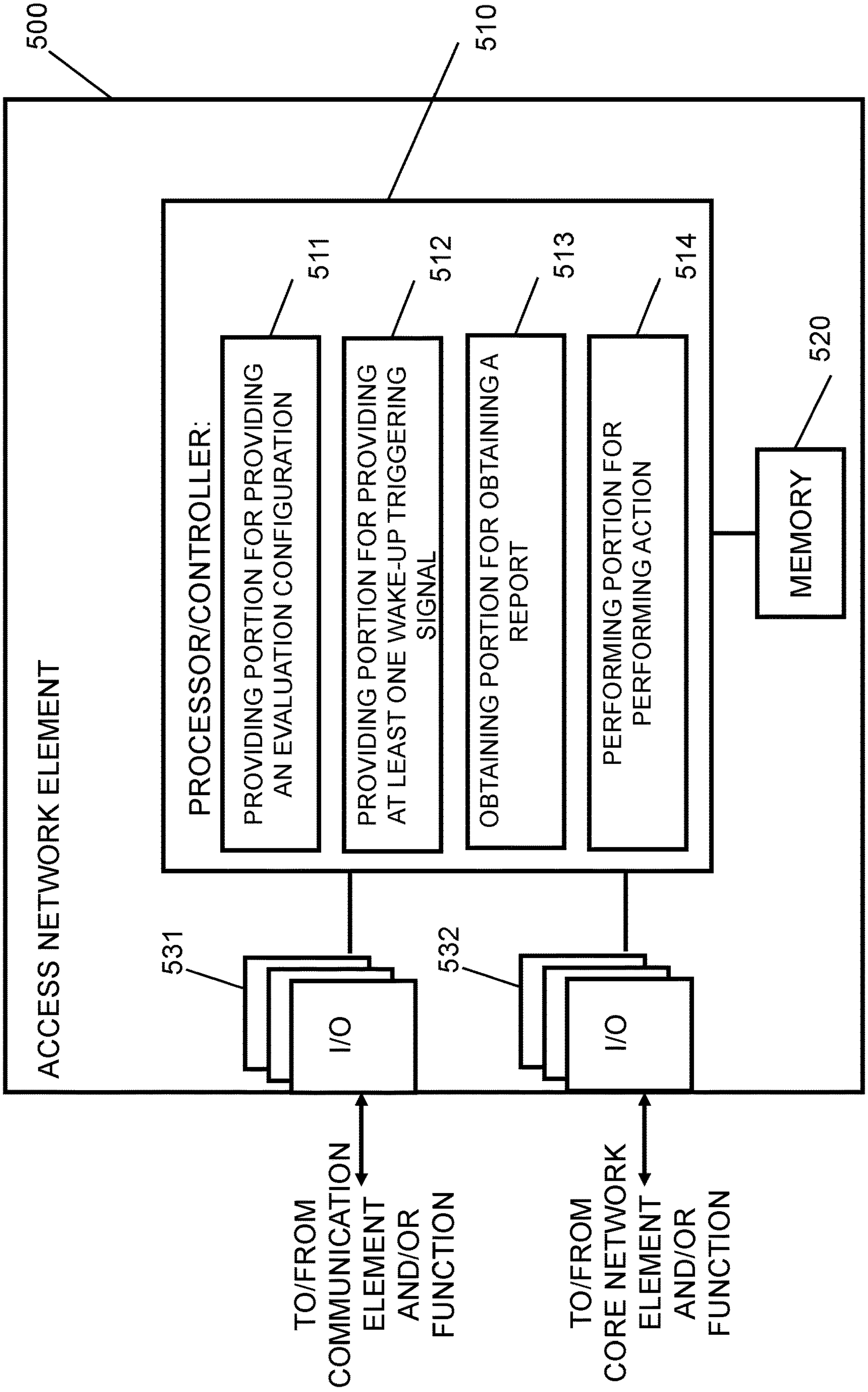
FIG. 5 shows a block diagram illustrating an apparatus according to various examples of embodiments.

Referring now to FIG. 5, FIG. 5 shows a block diagram illustrating an apparatus according to various examples of embodiments.

Specifically, FIG. 5 shows a block diagram illustrating an apparatus, which may represent an access network element, like e.g. a gNB, which may represent such network (such gNB 110) as outlined above with reference to steps 1 to 12 in FIG. 1, according to various examples of embodiments, which may participate in measurements to support a LP-WUS. Furthermore, even though reference is made to an access network element, the access network element may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 500 shown in FIG. 5 may include a processing circuitry, a processing function, a control unit or a processor 510, such as a CPU or the like, which is suitable to measurements to support a LP-WUS. The processor 510 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 531 and 532 denote input/output (I/O) units or functions (interfaces) connected to the processor or processing function 510. The I/O units 531 and 532 may be a combined unit including communication equipment towards several entities/elements, or may include a distributed structure with a plurality of different interfaces for different entities/elements. Reference sign 520 denotes a memory usable, for example, for storing data and programs to be executed by the processor or processing function 510 and/or as a working storage of the processor or processing function 510. It is to be noted that the memory 520 may be implemented by using one or more memory portions of the same or different type of memory, but may also represent an external memory, e.g. an external database provided on a cloud server.

The processor or processing function 510 is configured to execute processing related to the above described processing. In particular, the processor or processing circuitry or function 510 includes one or more of the following sub-portions. Sub-portion 511 is a providing portion, which is usable as a portion for providing an evaluation configuration. The portion 511 may be configured to perform processing according to S310 of FIG. 3. Further, sub-portion 512 is a providing portion, which is usable as a portion for providing at least one wake-up triggering signal. The portion 512 may be configured to perform processing according to S320 of FIG. 3. Moreover, sub-portion 513 is an obtaining portion, which is usable as a portion for obtaining a report. The portion 513 may be configured to perform processing according to S330 of FIG. 3. In addition, sub-portion 514 is a performing portion, which is usable as a portion for performing action. The portion 514 may be configured to perform processing according to S340 of FIG. 3.

It shall be noted that the apparatuses 400 and 500 as outlined above with reference to FIGS. 4 and 5 may comprise further/additional sub-portions, which may allow the apparatuses 400 and 500 to perform such methods/method steps as outlined above with reference to FIG. 1 as well as FIGS. 2 and 3.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. A user equipment (UE) operating in a Fifth-Generation (5G) New Radio (NR) system in a Radio Resource Control (RRC) INACTIVE state and equipped with a dedicated low power wake-up signal (LP-WUS) receiver, the UE comprising:

a processor; and a memory comprising computer-executable instructions that, when executed by the processor, cause the UE to perform the following operations:

reporting, by a user equipment (UE) to a network, support of an optional measurement capability for one or more low-power wake-up signal (LP-WUS) trustworthiness metrics; wherein the one or more LP-WUS trustworthiness metrics comprise: (a) the first metric is defined as the UE being capable to determine, for a configured time period and a configured number of detected wake-up triggering signals as specified by RRC, a count of wake-up triggering signals that were successfully detected and decoded by the LP-WUS receiver but for which a subsequent main-radio paging reception either (i) fails or (ii) succeeds with no paging directed to the UE and wherein, for the active configuration of the first metric, a paging fail branch in item (i) is disabled such that only item (ii) is counted; (b) the second metric is defined as the UE being capable to measure, for the configured time period and number, a count of detectable wake-up triggering signals that fail a wake-up-signal-specific decoding step, including a failure due to an incorrect security word; (c) the third metric is defined as the UE being capable to measure, for the configured time period and number, a count of wake-up triggering signals that are successfully detected but remain undecodable after completion of a decoding attempt, and to retain timestamps of such undecodable events; (d) the fourth metric is defined as the UE being capable to measure a relative and absolute LP-WUS signal strength, optionally only when main-radio paging reception fails, and to associate the measured strength with at least a serving-cell identifier; (e) the fifth metric is defined as the UE being capable to log a time difference from LP-WUS detection to (i) a start of paging monitoring and (ii) a completion of paging decoding, each as separate fields; and (f) the sixth metric is defined as the UE being capable to compute, over a configured window, an average time-axis drift delay based on differences between expected and observed arrival times of low-power beacons, and to count missed beacons and exceedances of a configured drift-delay threshold;

obtaining, via unicast RRC signaling from the serving gNB, an evaluation configuration including at least one metric for LP-WUS trustworthiness evaluation that identifies the first metric as the sole metric by including a metric-identifier parameter set to the first metric, specifies a per-UE threshold defined as a maximum permitted count within a configured time period, and identifies a particular LP-WUS sub-group to which the metric applies;

detecting at least one provided wake-up triggering signal with the dedicated LP-WUS receiver as non-periodic transmissions provided by the serving gNB and belonging to the identified LP-WUS sub-group;

by use of the first metric, evaluating the at least one detected wake-up triggering signal by counting, only within the configured time period and only for the identified sub-group, instances in which the UE's main radio successfully detects, receives, and decodes a paging message but the paging message contains no paging for the UE;

determining that the condition included in the evaluation configuration is fulfilled based on the count exceeding the per-UE threshold; and providing, responsive to the determination and upon request from the serving gNB, a report comprising information indicative of at least a result obtained from the determining of whether or not the condition is fulfilled, the report further identifying the first metric as the trigger and including (A) a cell identifier of where the event occurred and (B) location information of the apparatus associated with the event.

2. The UE of claim 1, wherein the evaluation configuration is provided exclusively via unicast RRC signaling and not via broadcast System Information Block (SIB) messaging, and includes explicit fields for the configured time period and the identified LP-WUS sub-group identifier.

3. The UE of claim 2, wherein detecting and evaluating further comprises filtering out and disregarding any detected wake-up triggering signal that does not carry the identified LP-WUS sub-group identifier prior to counting instances under the first metric.

4. The UE of claim 3, wherein providing the report comprises first transmitting a report-availability indication and, responsive to a subsequent request from the serving gNB, transmitting the report including (i) the accumulated count, (ii) the configured time period, (iii) the LP-WUS sub-group identifier, and (iv) a timestamp of at least one counted instance.

5. The UE of claim 4, wherein the location information included in the report comprises: (A) a serving-cell identifier and (B) a geographic location of the UE determined at a time of a counted instance.

6. The UE of claim 5, wherein the computer-executable instruction further case the UE to perform the following operations: responsive to determining that the condition is fulfilled, triggering operation of a main radio to perform serving-cell and neighbor-cell measurements prior to providing the report.

7. The UE of claim 6, wherein, when a condition associated with the first metric is fulfilled, the UE stores information related to the occurred event and provides a report including information indicative of the metric used and information on the cell where the event occurred.

8. A system comprising:

a user equipment (UE) operating in a Fifth-Generation (5G) New Radio (NR) system in a Radio Resource Control (RRC) INACTIVE state and equipped with a dedicated low power wake-up signal (LP-WUS) receiver:

a processor; and a memory comprising computer-executable instructions that, when executed by the processor, cause the UE to perform the following operations:

reporting, by a user equipment (UE) to a network, support of an optional measurement capability for one or more low-power wake-up signal (LP-WUS) trustworthiness metrics; wherein the one or more LP-WUS trustworthiness metrics comprise: (a) the first metric is defined as the UE being capable to determine, for a configured time period and a configured number of detected wake-up triggering signals as specified by RRC, a count of wake-up triggering signals that were successfully detected and decoded by the LP-WUS receiver but for which a subsequent main-radio paging reception either (i) fails or (ii) succeeds with no paging directed to the UE and wherein, for the active configuration of the first metric, a paging fail branch in item (i) is disabled such that only item (ii) is counted; (b) the second metric is defined as the UE being capable to measure, for the configured time period and number, a count of detectable wake-up triggering signals that fail a wake-up-signal-specific decoding step, including a failure due to an incorrect security word; (c) the third metric is defined as the UE being capable to measure, for the configured time period and number, a count of wake-up triggering signals that are successfully detected but remain undecodable after completion of a decoding attempt, and to retain timestamps of such undecodable events; (d) the fourth metric is defined as the UE being capable to measure a relative and absolute LP-WUS signal strength, optionally only when main-radio paging reception fails, and to associate the measured strength with at least a serving-cell identifier; (e) the fifth metric is defined as the UE being capable to log a time difference from LP-WUS detection to (i) a start of paging monitoring and (ii) a completion of paging decoding, each as separate fields; and (f) the sixth metric is defined as the UE being capable to compute, over a configured window, an average time-axis drift delay based on differences between expected and observed arrival times of low-power beacons, and to count missed beacons and exceedances of a configured drift-delay threshold;

obtaining, via unicast RRC signaling from the serving gNB, an evaluation configuration including at least one metric for LP-WUS trustworthiness evaluation that identifies the first metric as the sole metric by including a metric-identifier parameter set to the first metric, specifies a per-UE threshold defined as a maximum permitted count within a configured time period, and identifies a particular LP-WUS sub-group to which the metric applies;

detecting at least one provided wake-up triggering signal with the dedicated LP-WUS receiver as non-periodic transmissions provided by the serving gNB and belonging to the identified LP-WUS sub-group;

by use of the first metric, evaluating the at least one detected wake-up triggering signal by counting, only within the configured time period and only for the identified sub-group, instances in which the UE's main radio successfully detects, receives, and decodes a paging message but the paging message contains no paging for the UE;

determining that the condition included in the evaluation configuration is fulfilled based on the count exceeding the per-UE threshold; and providing, responsive to the determination and upon request from the serving gNB, a report comprising information indicative of at least a result obtained from the determining of whether or not the condition is fulfilled, the report further identifying the first metric as the trigger and including (A) a cell identifier of where the event occurred and (B) location information of the apparatus associated with the event.

9. The system of claim 8, wherein the evaluation configuration is provided exclusively via unicast RRC signaling and not via broadcast System Information Block (SIB) messaging, and includes explicit fields for the configured time period and the identified LP-WUS sub-group identifier.

10. The system of claim 9, wherein detecting and evaluating further comprises filtering out and disregarding any detected wake-up triggering signal that does not carry the identified LP-WUS sub-group identifier prior to counting instances under the first metric.

11. The system of claim 10, wherein providing the report comprises first transmitting a report-availability indication and, responsive to a subsequent request from the serving gNB, transmitting the report including (i) the accumulated count, (ii) the configured time period, (iii) the LP-WUS sub-group identifier, and (iv) a timestamp of at least one counted instance.

12. The system of claim 11, wherein the location information included in the report comprises: (A) a serving-cell identifier and (B) a geographic location of the UE determined at a time of a counted instance.

13. The system of claim 12, wherein the computer-executable instruction further case the UE to perform the following operations: responsive to determining that the condition is fulfilled, triggering operation of a main radio to perform serving-cell and neighbor-cell measurements prior to providing the report.

14. The system of claim 13, wherein, when a condition associated with the first metric is fulfilled, the UE stores information related to the occurred event and provides a report including information indicative of the metric used and information on the cell where the event occurred.

15. A method perform by user equipment (UE) operating in a Fifth-Generation (5G) New Radio (NR) system in a Radio Resource Control (RRC) INACTIVE state and equipped with a dedicated low power wake-up signal (LP-WUS) receiver, the method comprising:

reporting, by a user equipment (UE) to a network, support of an optional measurement capability for one or more low-power wake-up signal (LP-WUS) trustworthiness metrics; wherein the one or more LP-WUS trustworthiness metrics comprise: (a) the first metric is defined as the UE being capable to determine, for a configured time period and a configured number of detected wake-up triggering signals as specified by RRC, a count of wake-up triggering signals that were successfully detected and decoded by the LP-WUS receiver but for which a subsequent main-radio paging reception either (i) fails or (ii) succeeds with no paging directed to the UE and wherein, for the active configuration of the first metric, a paging fail branch in item (i) is disabled such that only item (ii) is counted; (b) the second metric is defined as the UE being capable to measure, for the configured time period and number, a count of detectable wake-up triggering signals that fail a wake-up-signal-specific decoding step, including a failure due to an incorrect security word; (c) the third metric is defined as the UE being capable to measure, for the configured time period and number, a count of wake-up triggering signals that are successfully detected but remain undecodable after completion of a decoding attempt, and to retain timestamps of such undecodable events; (d) the fourth metric is defined as the UE being capable to measure a relative and absolute LP-WUS signal strength, optionally only when main-radio paging reception fails, and to associate the measured strength with at least a serving-cell identifier; (e) the fifth metric is defined as the UE being capable to log a time difference from LP-WUS detection to (i) a start of paging monitoring and (ii) a completion of paging decoding, each as separate fields; and (f) the sixth metric is defined as the UE being capable to compute, over a configured window, an average time-axis drift delay based on differences between expected and observed arrival times of low-power beacons, and to count missed beacons and exceedances of a configured drift-delay threshold;

obtaining, via unicast RRC signaling from the serving gNB, an evaluation configuration including at least one metric for LP-WUS trustworthiness evaluation that identifies the first metric as the sole metric by including a metric-identifier parameter set to the first metric, specifies a per-UE threshold defined as a maximum permitted count within a configured time period, and identifies a particular LP-WUS sub-group to which the metric applies;

detecting at least one provided wake-up triggering signal with the dedicated LP-WUS receiver as non-periodic transmissions provided by the serving gNB and belonging to the identified LP-WUS sub-group;

by use of the first metric, evaluating the at least one detected wake-up triggering signal by counting, only within the configured time period and only for the identified sub-group, instances in which the UE's main radio successfully detects, receives, and decodes a paging message but the paging message contains no paging for the UE;

determining that the condition included in the evaluation configuration is fulfilled based on the count exceeding the per-UE threshold; and providing, responsive to the determination and upon request from the serving gNB, a report comprising information indicative of at least a result obtained from the determining of whether or not the condition is fulfilled, the report further identifying the first metric as the trigger and including (A) a cell identifier of where the event occurred and (B) location information of the apparatus associated with the event.

16. The method of claim 15, wherein the evaluation configuration is provided exclusively via unicast RRC signaling and not via broadcast System Information Block (SIB) messaging, and includes explicit fields for the configured time period and the identified LP-WUS sub-group identifier.

17. The method of claim 16, wherein detecting and evaluating further comprises filtering out and disregarding any detected wake-up triggering signal that does not carry the identified LP-WUS sub-group identifier prior to counting instances under the first metric.

18. The method of claim 17, wherein providing the report comprises first transmitting a report-availability indication and, responsive to a subsequent request from the serving gNB, transmitting the report including (i) the accumulated count, (ii) the configured time period, (iii) the LP-WUS sub-group identifier, and (iv) a timestamp of at least one counted instance.

19. The method of claim 18, wherein the location information included in the report comprises: (A) a serving-cell identifier and (B) a geographic location of the UE determined at a time of a counted instance.

20. The method of claim 19, wherein the computer-executable instruction further case the UE to perform the following operations: responsive to determining that the condition is fulfilled, triggering operation of a main radio to perform serving-cell and neighbor-cell measurements prior to providing the report, and wherein, when a condition associated with the first metric is fulfilled, the UE stores information related to the occurred event and provides a report including information indicative of the metric used and information on the cell where the event occurred.

* * * * *